United States Patent [19]

Pociluyko

[11] 4,340,386
[45] * Jul. 20, 1982

[54] CATIONIC DYESTUFF PRINTING INKS

[75] Inventor: Alex Pociluyko, Glen Mills, Pa.

[73] Assignee: Scott Paper Company, Philadelphia, Pa.

[*] Notice: The portion of the term of this patent subsequent to Sep. 9, 1997, has been disclaimed.

[21] Appl. No.: 206,730

[22] Filed: Nov. 14, 1980

Related U.S. Application Data

[60] Continuation-in-part of Ser. No. 88,288, Oct. 26, 1979, which is a division of Ser. No. 902,661, May 4, 1978, Pat. No. 4,221,562.

[51] Int. Cl.³ .................... C09B 67/00; D06P 3/60; D06P 5/02
[52] U.S. Cl. ........................................ 8/541; 8/608; 8/919; 106/22
[58] Field of Search .................. 106/22; 8/506, 541, 8/608, 919

[56] References Cited

U.S. PATENT DOCUMENTS

| | | | |
|---|---|---|---|
| 2,761,868 | 9/1956 | Lacey | 260/314.5 |
| 3,337,288 | 8/1967 | Horiguchi et al. | 260/144 |
| 3,709,903 | 1/1973 | Jefferies et al. | 260/326.43 |
| 3,784,599 | 1/1974 | Jefferies et al. | 260/242 |
| 3,839,291 | 10/1974 | Avis | 260/70 R |
| 3,860,547 | 1/1975 | Faessinger et al. | 260/29.4 R |
| 3,864,296 | 2/1975 | Faessinger | 260/29.2 N |
| 3,880,792 | 4/1975 | Faessinger | 260/29.2 N |
| 3,935,182 | 1/1976 | Jefferies et al. | 260/326.43 |
| 3,996,282 | 12/1976 | Jefferies et al. | 260/567.6 M |
| 4,065,500 | 12/1977 | Jefferies et al. | 260/567.6 M |
| 4,081,239 | 3/1978 | Jefferies | 260/314.5 |
| 4,103,092 | 7/1978 | Jefferies et al. | 260/175 |
| 4,123,428 | 10/1978 | Holliger et al. | 260/144 |
| 4,143,034 | 3/1979 | Jefferies et al. | 260/160 |
| 4,221,562 | 9/1980 | Pociluyko | 8/506 |

*Primary Examiner*—Maria Parrish Tungol
*Attorney, Agent, or Firm*—Nicholas J. DeBenedictis; John A. Weygandt; John W. Kane, Jr.

[57] ABSTRACT

Bleed-fast, dyed cellulosics particularly absorbent papers have been obtained with a particular class of water-soluble, cationic dyes reacted with a water-soluble aldehyde, preferably formaldehyde, glyoxal or glutaraldehyde. An aqueous printing fluid containing the water-soluble cationic dye and the aldehyde, upon drying, produces a water-resistant dyestuff having improved bleed fastness upon cellulosic fibers.

6 Claims, No Drawings

CATIONIC DYESTUFF PRINTING INKS

CROSS REFERENCED TO RELATED PATENT APPLICATIONS

This application is a continuation-in-part of Ser. No. 088,288 filed Oct. 26, 1979 titled Bleed Fast Cationic Dyestuffs which application is a division of Ser. No. 902,661, filed May 4, 1978, now U.S. Pat. No. 4,221,562 issued Sept. 9, 1980.

BACKGROUND OF THE INVENTION

1. Field of the Invention

This invention concerns water-insensitive, cationic dyestuffs, cellulosic fibers dyed with the dyestuffs and water based printing fluids made with specific, water-soluble cationic dyestuffs and a watersoluble dialdehyde which fluid is particularly suitable for printing and coloring cellulosic webs.

2. Description of the Prior Art

Aqueous printing fluids employing water-soluble dyes and having good bleed fastness (water insensitivity) after drying of the fluid, especially on cellulosic fibers, have been made by combining water-soluble, cationic, thermosetting resins with water-soluble dyes compatible with the resin in a water solution. Drying of the printing fluid upon cellulosic fibers, cures or sets the thermosetting resin. The cured resin entraps and/or reacts with the dye and gives it some permanence because of the water insensitivity of the cured resin.

Examples of such printing fluids employing a resin and a dye are disclosed in U.S. Pat. No. 3,860,547 entitled PRINTING FLUID, inventor R. W. Faessinger et al; U.S. Pat. No. 3,864,296 entitled AQUEOUS PRINTING FLUIDS FOR PAPER, inventor R. W. Faessinger; U.S. Pat. No. 3,880,792 entitled ROTOGRAVURE PRINTING PROCESS, inventor R. W. Faessinger and U.S. Pat. No. 3,839,291 entitled WET-STRENGTH RESINS AND PROCESSES FOR MAKING AND USING SAME, inventor R. P. Avis.

Many different classes of water-soluble, cationic dyestuffs are known. However, one particular class of water-soluble, cationic dyestuff is required for use in the present invention. The required type of dye is disclosed in U.S. Pat. No. 3,709,903 entitled WATER-SOLUBLE QUATERNARY AMMONIUM PHTHALOCYANINE DYE-STUFFS, inventor P. J. Jefferies et al and other patents by the same inventor, based in part upon the '903 patent and differing mainly in the chromophore component of the dyestuff. Other patents disclosing suitable dyestuffs by P. J. Jefferies et al, include U.S. Pat. Nos. 3,784,599; 3,935,182; 3,996,282; 4,065,500; 4,081,239 and 4,103,092. Other suitable cationic water-soluble dyes are disclosed in U.S. Pat. No. 2,761,868.

SUMMARY OF THE INVENTION

An aqueous printing fluid for cellulosic fibers is provided that produces a water-insensitive dyestuff on cellulosic fibers. The printing fluid comprises a water solution of a dialdehyde, preferably glyoxal or glutaraldehyde and a water-soluble, cationic dyestuff of a type disclosed in said P. J. Jefferies et al patents or dyestuffs equivalent thereto by having a lower alkylene amine group capable of reacting with a dialdehyde. Drying of the water solution on cellulosic fibers produces a dyestuff which is the reaction product of the water-soluble, cationic dyestuff and the dialdehyde. The solution of the water-soluble, cationic dyestuff and the dialdehyde is substantive to cellulosic fibers and can be used in the papermaking pulp slurry to produce a colored web. Cellulosic fibers and cellulosic webs dyed with the reaction product of the water-soluble, cationic dyestuff and the water-soluble dialdehyde have excellent bleed fastness in the presence of water, milk, or soap.

DETAILED DESCRIPTION OF THE INVENTION

It has been discovered that a certain class of water-soluble, cationic dyestuffs will react with a water-soluble aldehyde to significantly enhance the bleed fastness of the dyestuff when applied to cellulosic fibers and dried.

DYESTUFFS

A water-soluble, cationic dyestuff suitable for use in the present invention can be selected from among the following formulae:

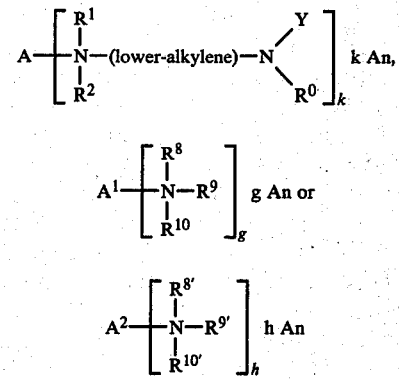

wherein
$R^0$ is hydrogen, lower-alkyl or hydroxy-lower-alkyl;
$R^1$ is lower-alkyl, lower-alkenyl or hydroxy-lower-alkyl;
$R^2$ is lower-alkyl, lower-alkenyl, hydroxy-lower-alkyl or (lower-alkylene)-$NR^0Y$ or $R^1$ and $R^2$ together with the nitrogen atom, are pyrrolidino, piperidino or 4-lower-alkanoyl piperazino;
Y is hydrogen or

wherein R is hydrogen, lower-alkyl, lower-alkenyl, phenyl or phenyl-lower-alkyl;
A is a dyestuff residue attached to the quaternary ammonium nitrogen atom through a lower-alkylene bridge.
k is a small integer whose value is dependent on the nature of A such that it has a range from one to two;
$R^8$ is lower-alkyl, lower-alkenyl or hydroxy-lower-alkyl;
$R^9$ is lower-alkyl, hydroxy-lower-alkyl or $NH_2$;
$R^{10}$ is lower-alkyl or lower-alkenyl;
$A^1$ is a dyestuff residue attached to the quaternary ammonium nitrogen atom through a lower-alkylene bridge;
g is a small integer whose value is dependent on the nature of $A^1$ such that it has a range from one to two;
$R^{8'}$ is lower alkyl;

R⁹' is lower-alkyl, lower-alkenyl or hydroxy-lower-alkyl;

R¹⁰' is lower-alkyl, lower-alkenyl or hydroxy-lower-alkyl or R⁹' and R¹⁰' together with the nitrogen atom are morpholino;

A² is a dyestuff residue attached to the quaternary ammonium nitrogen atom through a lower-alkylene bridge;

h is a small integer whose value is dependent on the nature of A² such that it has a range from one to two; and An is anion.

Water-soluble cationic dyestuffs of the above formulae are disclosed in trade literature of the Hilton-Davis Chemical Company, a division of Sterling Drug, Inc. of Cincinnati Ohio entitled ZIP DYES—A NEW SERIES OF CATIONIC COLORANTS FOR PAPER DYEING, co-authors Nathan N. Crounce, Patrick J. Jefferies, E. Kenneth Moore and Bruce G. Webster, a copy of which is enclosed herewith. The water-soluble cationic dyes of the above formulae, their method of synthesis and their properties are disclosed in five U.S. patents issued to Patrick J. Jefferies et al, Pat. Nos. 3,709,903; 3,784,599; 3,935,182, 3,996,282 and 4,065,500, copies of which are enclosed herewith and which patents are incorporated herein by reference with respect to the disclosure of dyes of the above formulae. Functionally equivalent, water-soluble cationic dyestuff with respect to obtaining the bleedfastness improvement provided by the present invention are those which react with said aldehydes disclosed herein.

Of special interest in the above formulae is the lower-alkylene amine group which may contain 1 to 5 carbon atoms i.e. $-(CH_2)_nNH_2$. The site on the water-soluble dyestuff where reaction takes place with the dialdehyde is believed to be the lower alkylene amine group and accordingly the broadest embodiment of this invention calls for the use of water-soluble, cationic dye having a functional lower alkylene amine group capable of reacting with formaldehyde, glyoxal or glutaraldehyde to enhance the bleedfastness of the dyestuff on cellulosic fibers. Dyes with different dye residues or otherwise different than the dyes disclosed in the Jefferies et al patents but having a functional group capable of reacting with formaldehyde, glyoxal or glutaraldehyde are functionally equivalent, for the purposes of this invention, to the dyes disclosed in the Jefferies et al patents.

Additional water-soluble cationic dyes that are functionally equivalent to the dyes disclosed in the Jefferies, et al patents are disclosed in Netherlands Pat. No. 7,802,478 which is based upon U.S. patent application Ser. No. 775,935 now U.S. Patent No. 4,143,034. The test for functional equivalency is whether the water-soluble cationic dye has a functional group capable of reacting with formaldehyde, glyoxal or glutaraldehyde to produce a dyestuff having improved bleedfastness on cellulosic fibers. Said U.S. Patent No. 4,143,034 discloses dyestuffs that are a mixture comprising a disazo compound which is polyaminomethylated with an average of x aminomethyl groups per molecule wherein said disazo compound is selected from the group consisting of

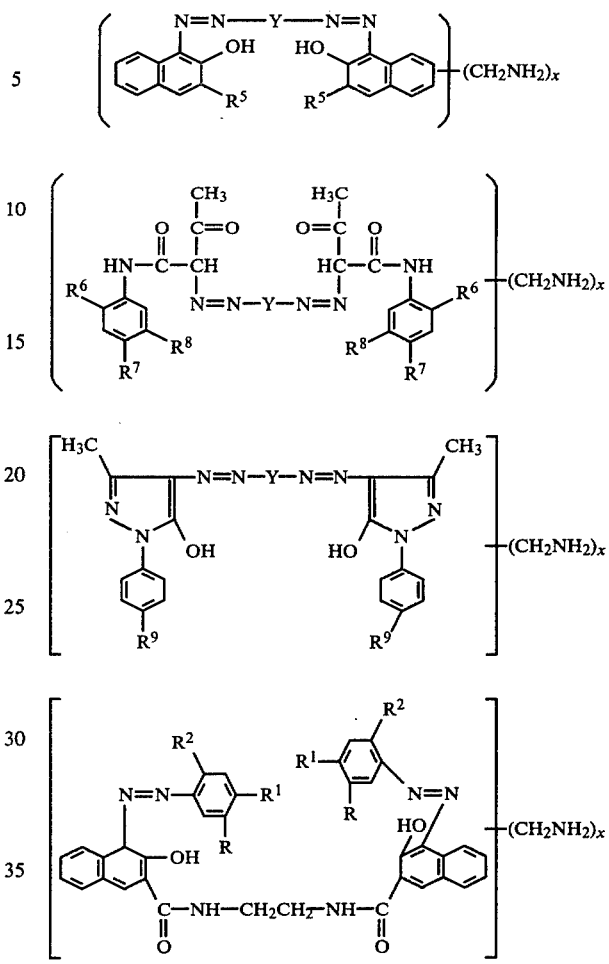

in which x represents a number in the range of one to eight

Y represents a divalent moiety selected from the class having the formulas

R represents hydrogen, $C_1$ to $C_3$ alkyl, $C_1$ to $C_3$ alkoxy or N-phenylsulfamoyl, R¹ represents hydrogen, $C_1$ to $C_3$ alkyl, $C_1$ to $C_3$ alkoxy, halo, N-phenylsulfamoyl or 6-methylbenzothiazol-2-yl, R², R³, R⁶, R⁷, R⁸, R¹⁰, R¹¹ and R¹² represent hydrogen, $C_1$ to $C_3$ alkyl, $C_1$ to $C_3$ alkoxy or halo, R⁴ represents hydrogen, $C_1$ to $C_3$ alkyl or $C_1$ to $C_3$ alkoxy, R⁵ represents hydrogen or a monovalent moiety selected from the class having the formulas

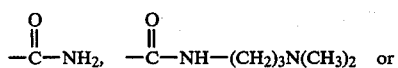

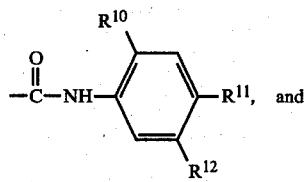

$R^9$ represents hydrogen or $C_1$ to $C_3$ alkyl; and the acid-addition salt forms of said mixtures.

The water-soluble, cationic dyestuffs of the type defined above are critical to the practice of the present invention because they are capable of reacting with formuladehyde or a water-soluble dialdehyde to improve their bleed fastness on cellulosic fibers and will be referred to hereinafter as the "Required Cationic Dyestuff."

Commercially, Required Cationic Dyestuff are usually available as a water solution containing from 25% to 50% active dyestuff solids by weight. References herein to parts of Required Cationic Dyestuff mean parts by weight based upon the weight of active dyestuff solids.

ALDEHYDES

The Required Cationic Dyestuff, when dissolved in water with an aldehyde such as formaldehyde or a dialdehyde, will, upon drying while in contact with cellulosic fibers, react with the dialdehyde, formaldehyde and/or the cellulosic fibers to produce a reaction product that is a dyestuff having significantly enhanced bleedfastness (water-insensitivity) on cellulosic fibers. The aldehyde is believed to function as a cross-linking agent. It must be formaldehyde, a water-soluble dialdehyde, preferably glyoxal or glutaraldehyde or water-soluble or dispersible equivalents thereof. The weight ratio of Required Cationic Dyestuff to the aldehyde should be sufficient to improve the bleed fastness of the dyestuff. Preferably a ratio of 1 part dyestuff to 0.125 parts formaldehyde or dialdehyde by weight is preferred although ratios of dyestuff to formaldehyde or dialdehyde of from about 1:1 to about 1:0.001 can be used. The cross-linking agents such as formaldehyde, glyoxal and glutaraldehyde, can be used singularly or in combination. Hereinafter, the term "dialdehyde" refers to formaldehyde in addition to glyoxal or glutaraldehyde.

Aqueous Printing Fluid

An aqueous printing fluid of the present invention is obtained by combining the Required Cationic Dyestuff with the dialdehyde in water. The preferred aqueous printing fluid contains from 0.1 to 10 percent Required Cationic Dyestuff and from 0.005 percent to 10 percent dialdehyde. Most preferred is one percent Required Cationic Dyestuff and 0.125 percent dialdehyde with the balance water. All parts and percents used herein are by weight and based upon the active solids.

The aqueous printing fluid of the present invention is very stable (1 to 3 month) and does not tend to cross-link or gel upon aging. The pH of the printing fluid is preferably acidic with a pH of from about 2 to about 7 being preferred.

The viscosity and tackiness of the printing solution can be adjusted for the optimum printing properties depending upon the mode of printing chosen. Known agents for this purpose can be used.

Substantivity

The combination of the Required Cationic Dyestuff and the dialdehyde in water is substantive to cellulosic fibers. Accordingly, the aqueous solution of them is suitable for use in the wet-end of a papermaking process. For example, the Required Cationic Dyestuff and the dialdehyde can be combined with cellulosic fibers in the pulp furnish prior to making a wet-laid paper web. This will produce an overall colored web as opposed to a printed web. Because of the substantivity, most of the Required Cationic Dyestuff and dialdehyde will be deposited upon the cellulosic fibers rather than draining through the web with the water. Upon drying, the colored web has improved bleed fastness.

Printing

An aqueous solution of the Required Cationic Dyestuff and the dialdehyde can be printed directly onto an already formed cellulosic web and subsequently dried to form the reaction product dyestuff, which has excellent bleed fastness on the cellulosic fibers. A mordant or other means of affixing the dye to the cellulosic fiber is not required.

The printing fluid is suitable for application techniques such as spraying, foam application, bath saturation, and coating in addition to conventional printing techniques such as rotogravure, intaglio or flexographic printing.

The advantage of the present invention in comparison with the use of the Required Cationic Dyestuff without the dialdehyde is that the dialdehyde reacts with the dyestuff so that the resulting dyestuff reaction product is significantly more water insensitive especially on cellulosic fibers.

Another technical advantage of the present invention is that the reaction product of the dialdehyde and the Required Cationic Dyestuff does not require a separate polymeric or wet-strength resin for bleed fastness on cellulosic fibers.

An analagous reaction product is not produced by the combination of any of the many known water-soluble direct or cationic dyestuffs other than the Required Cationic Dyestuff with the water-soluble dialdehyde.

In the following examples, representative samples of different classes of direct or cationic dyestuffs were combined with a dialdehyde in water to produce a printing fluid. The types of dyestuffs are listed in Table I. The resulting printing fluids were compared with the printing fluids of the present invention. In all of the examples, the printing fluid contained by weight, 1% water-soluble dyestuff, a percentage dialdehyde as indicated in Table I and the balance water. The printing fluid was printed onto a sample of an ordinary absorbent cellulosic web not containing wet strength resins (wet-laid cellulosic web). The printed web was dried and then subjected to three tests for bleed fastness, one with water, one with milk and one with an alkaline soap solution. The invention is very suitable for use on cellulosic webs containing wet-strength resins however, a non-wet-strengthen web was used in the examples in order to prove that the improvement in bleed fastness was due to the invention and not due to a presence of a wet-strength resin. Bleed fastness was tested as follows:

Bleed Fastness Test from Hilton-Davis under the tradename Aquonium, Yellow, 20-4453. It has the chemical formula:

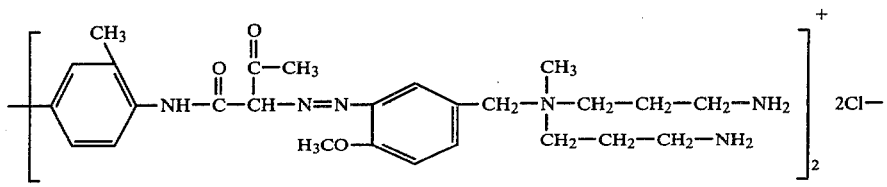

The purpose of the test is to measure bleed fastness or resistance to bleed (color transfer) which is a measurement of the intensity of the color transferred from one square inch of paper onto a specified filter paper under a specified weight after exposure to a liquid.

The materials and apparatus used for the determination of bleed fastness are: Whatman No. 1 filter paper (5.5 CM diameter), stainless steel plates of dimension 1/16×1.5×1.5 inches and stainless steel weight weighing two pounds with approximate dimensions of 1½ inch diameter and 4 inch height.

Bleed fastness is tested after exposure to different liquids selected as representing the foodstuffs, liquids and cleansing agents usually encountered by a paper towel in household use. The liquids are:

(1) Soap and Water solution:
0.5% Ivory Liquid Soap solution pH—10.2±0.2
Temperature—60° C.-140° F.

(2) Milk—Homogenized milk-butterfat content, minimum 3.25%

(3) Water—General tap water.

The samples to be tested are cut into one inch squares which are layered to 4 plies with the decoration or printing facing outward (outer plies).

The sample should be aged seven days before tested for bleed fastness or cured at a temperature and time for artificial aging selected to approximate a 7-day natural aging.

The specimen to be tested is wet for 3-5 seconds in the liquid, placed on white absorbent paper and excess liquid is eliminated by rolling the specimen and the absorbent paper, without pressing, 4 times with the two-pound weight.

Three sheets of filter paper are placed on one of the 1.5 inch steel plates, the wet specimen is centered on the top sheet of filter paper and three additional sheets of filter paper are placed over the specimen. An additional 1.5 inch steel plate is placed above the top filter paper. On top of the steel plate is placed the two-pound weight.

After 15 minutes the test is stopped and the filter paper in contact with the specimen is evaluated for bleed fastness by visual comparison against four standards. The standards represent a range of bleed levels identified on a 0, 1, 2 and 3 system whereby "0" is no color transfer and "3" is severe color transfer with 1 and 2 being equally spaced between 0 and 3. Individual ratings are recorded to the nearest 0.5 pt. increment (an individual sample judged to be mid-way between the 1 and 2 visual standards should be recorded as 1.5). The rating of bleed is the Bleed Transference Value of the dyestuff on cellulosic fibers. The lower the rating the greater the bleed fastness.

EXAMPLE 1

The Required Cationic Dyestuff used as the water-soluble yellow dyestuff in this example was obtained from Hilton-Davis under the tradename Aquonium, Yellow, 20-4453. It has the chemical formula:

The Required Cationic Dyestuff was combined with water and with various quantities of glyoxal or glutaraldehyde as indicated in Table II, to form printing solutions containing 1% Required Cationic Dyestuff, dyaldehyde and the balance water. The pH of the printing fluid was on the acidic side. The printing fluid was used to print a yellow colored pattern on the absorbent cellulosic web. The printed web was dried to form the reaction product of the Required Cationic Dyestuff and dialdehyde on the cellulosic fibers and the bleed fastness of the web printed with the reaction product was tested. The results of the test are given in Table II along with the bleed fastness of a control printing fluid not containing any dialdehyde.

EXAMPLE 2 AND COMPARATIVE EXAMPLES A THROUGH P

For Example 2, the procedure of Example 1 was repeated and the bleed fastness of the printed cellulosic web was tested. Formaldehyde, glyoxal and gluteraldehyde were each tested in amounts shown in Table II. The Required Cationic Dyestuff used in Example 2 is known as Aquonium Turquoise 20-2358 which is defined chemically in said U.S. Pat. No. 3,709,903. In the comparative examples, 16 different water-soluble dyestuffs containing primary or secondary nitrogen atoms but not containing a lower-alkylene amine group were employed and, accordingly, fall outside the present invention. The dyestuff used in each of the examples is identified chemically in Table 1 according to their Colour Index Number and name as published in the Colour Index, Third Edition, 1971, published by The Society of Dyers and Colourists, Great Britian. Table II contains the results of the tests for bleed fastness. The values are defined as the Bleed Transference Value of the printed cellulosic fibrous or web.

SIGNIFICANCE

As can be seen from the results of the examples performed according to the present invention and the comparative examples, a particular class of water-soluble, cationic dyestuffs are capable of reacting with formaldehyde, glyoxal or glutaraldehyde (both dialdehydes) to produce a reaction product dyestuff that is water insensitive on cellulosic fibers.

The reaction product dyestuff upon cellulosic fibers exhibits greater water insensitivity and bleed fastness than the combination of water-soluble, cationic thermosetting resins and dyestuffs as disclosed in the Faessinger patents and also exhibits greater bleed fastness and water insensitivity than the other water-soluble dyestuffs with a dialdehyde.

TABLE I

| Example No. | Type | Dyestuff C.I. Name | C.I. Number |
|---|---|---|---|
| 1 | Cationic | Aquonium Yellow* | 20-4453* |
| 2 | Cationic | Aquonium Turquoise* | 20-2358* |
| A | Diazo I or II | Direct Blue 15 | 24400 |
| B | Diazo I or II | Direct Blue 1 | 24410 |
| C | Diazo I or II | Direct Violet 22 | 22480 |
| D | Diazo I or II | Direct Blue 218 | 24401 |
| E | Diazo III | Direct Red 16 | 27680 |
| F | Diazo III | Direct Red 81 | 28160 |
| G | Diazo IV | Direct Yellow 44 | 29000 |
| H | Diazo IV | Direct Yellow 50 | 29025 |
| I | Diazo IV | Direct Orange 10 | 29156 |
| J | Diazo IV | Direct Red 72 | 29200 |
| K | Triazo 1 | Direct Brown 95 | 30145 |
| L | Anthraquinone | Acid Blue 40 | 62125 |
| M | Azine | Acid Black | 50420 |
| N | Phthalocyanine | Direct Blue 86 | 741801 |
| O | Stibine | Direct Orange 15 | 40002-03 |
| P | Xanthene | Basic Red 1 | 45160 |

*Manufacture's tradename and number for the dyestuff.

TABLE II

| Example No. | Dialdehyde Type | Percent | Bleed Fastness Soap | Milk | Water |
|---|---|---|---|---|---|
| 1 | Glutaraldehyde | 0 | 3.0 | 2.5 | 3.0 |
| 1 | Glutaraldehyde | 0.25 | 0 | 0 | 0 |
| 1 | Glutaraldehyde | 1.0 | 0 | 0 | 0 |
| 1 | Glutaraldehyde | 2.0 | 0 | 0 | 0 |
| 1 | Glyoxal | 0.25 | 0 | 0 | 0 |
| 1 | Glyoxal | 1.0 | 0 | 0 | 0 |
| 1 | Glyoxal | 2.0 | 0 | 0 | 0 |
| 2 | Glutaraldehyde | 0 | 0 | 0 | 3.0 |
| 2 | Glutaraldehyde | 0.25 | 0 | 0 | 0.5 |
| 2 | Glutaraldehyde | 1.0 | 0 | 0 | 0 |
| 2 | Glyoxal | 0.25 | 0 | 0 | 0.5 |
| 2 | Glyoxal | 1.0 | 0 | 0 | 0 |
| A | Glyoxal | 1.0 | 3 | 3 | 3 |
| B | Glyoxal | 1.0 | 3 | 3 | 3 |
| C | Glyoxal | 1.0 | 3 | 3 | 3 |
| D | Glyoxal | 1.0 | 3 | 3 | 3 |
| E | Glyoxal | 1.0 | 3 | 3 | 3 |
| F | Glyoxal | 1.0 | 3 | 3 | 3 |
| G | Glyoxal | 1.0 | 3 | 3 | 3 |
| H | Glyoxal | 1.0 | 3 | 3 | 3 |
| I | Glyoxal | 1.0 | 3 | 3 | 3 |
| J | Glyoxal | 1.0 | 3 | 3 | 3 |
| K | Glyoxal | 1.0 | 3 | 3 | 3 |
| L | Glyoxal | 1.0 | 3 | 3 | 3 |
| M | Glyoxal | 1.0 | 3 | 3 | 3 |
| N | Glyoxal | 1.0 | 3 | 3 | 3 |
| O | Glyoxal | 1.0 | 3 | 3 | 3 |
| P | Glyoxal | 1.0 | 3 | 3 | 3 |
| 2 | Formaldehyde | 0.5 | 0.5 | 0.5 | 3 |
| 2 | Formaldehyde | 0.094 | 0 | 1.0 | 1.5 |
| 2 | Formaldehyde | 0.375 | 0 | 1.0 | 1.5 |
| 2 | Formaldehyde | 1.875 | 0 | 0.5 | 1.0 |
| 2 | Formaldehyde | 2.625 | 0 | 0 | 1.0 |

What is claimed is:

1. An aqueous, printing fluid containing an aldehyde selected from the group consisting of formaldehyde, glyoxal and glutaraldehyde and a water-soluble, cationic dyestuff having a functional group capable of reacting with the aldehyde to produce a reaction product dyestuff having improved bleed fastness on cellulosic fibers.

2. The printing fluids of claim 1 wherein the dyestuff is a mixture comprising a disazo compound which is polyaminomethylated with an average of x aminomethyl groups per molecule wherein said disazo compound is selected from the group consisting of:

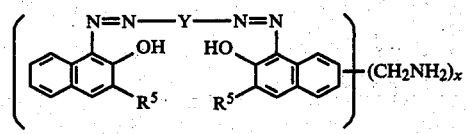

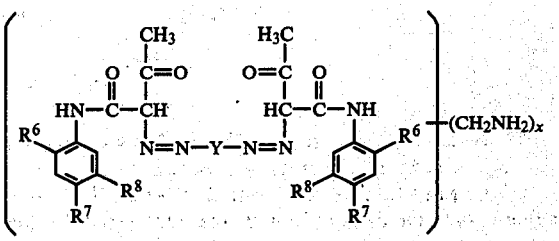

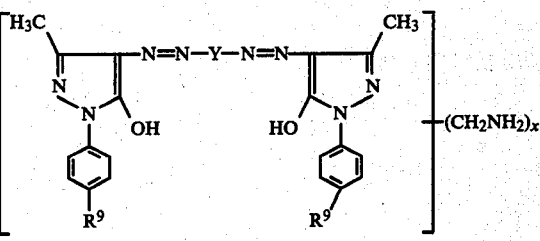

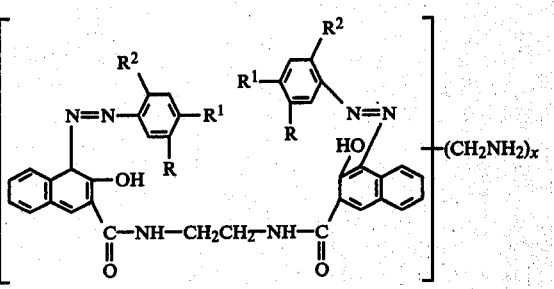

in which
x represents a number in the range of one to eight
Y represents a divalent moiety selected from the class having the formulas

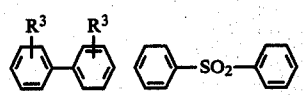

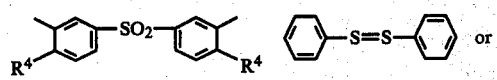

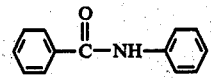

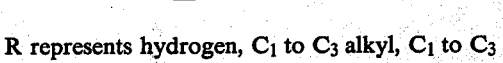

R represents hydrogen, $C_1$ to $C_3$ alkyl, $C_1$ to $C_3$ alkoxy or N-phenylsulfamoyl, $R^1$ represents hydrogen, $C_1$ to $C_3$ alkyl, $C_1$ to $C_3$ alkoxy, halo, N-phenylsulfamoyl or 6-methylbenzothiazol-2-yl, $R^2$, $R^3$, $R^6$, $R^7$, $R^8$, $R^{10}$, $R^{11}$ and $R^{12}$ represent hydrogen, $C_1$ to $C_3$ alkyl, $C_1$ to $C_3$ alkoxy or halo, $R^4$ represents hydrogen, $C_1$ to $C_3$ alkyl or $C_1$ to $C_3$ alkoxy, $R^5$ represents hydrogen or a monovalent moiety selected from the class having the formulas

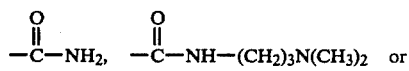

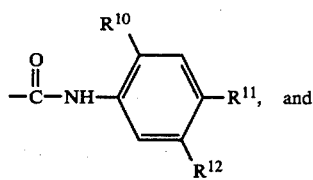

$R^9$ represents hydrogen or $C_1$ to $C_3$ alkyl; and the acid-addition salt forms of said mixtures.

3. The printing fluid of claim 1, wherein the water-soluble, cationic dyestuff comprises from about 0.1 part to about 10 parts per hundred parts of the aqueous printing fluid by weight.

4. The aqueous printing fluid of claim 3, wherein the pH of the printing fluid is from about 2 to about 7 and wherein the dialdehyde comprises from about 10 parts to about 0.005 parts per hundred parts of the aqueous printing fluid, by weight.

5. The printing fluid of claims 2, 3 or 4, wherein the pH is below 7 and the ratio of parts by weight of water-soluble cationic dyestuff to dialdehyde is from about 1:1 to about 1:0.005.

6. A non-woven, absorbent, cellulosic web having good bleed fastness said web having been printed with the printing fluid of claim 1 and dried.

* * * * *